United States Patent
Hanada et al.

(10) Patent No.: US 6,495,490 B2
(45) Date of Patent: Dec. 17, 2002

(54) THERMAL RECORDING MEDIA

(75) Inventors: Kazuyuki Hanada, Tokyo (JP); Katsutoshi Torii, Tokyo (JP); Kazuya Kimura, Tokyo (JP)

(73) Assignees: Dainichiseika Color & Chemicals Mfg. Co., Ltd., Tokyo (JP); Ukima Colour & Chemicals Mfg. Co., Ltd., Tokyo (JP)

( * ) Notice: Subject to any disclaimer, the term of this patent is extended or adjusted under 35 U.S.C. 154(b) by 85 days.

(21) Appl. No.: 09/801,739

(22) Filed: Mar. 9, 2001

(65) Prior Publication Data

US 2001/0034301 A1 Oct. 25, 2001

(30) Foreign Application Priority Data

Mar. 21, 2000 (JP) .................................... 2000-078319

(51) Int. Cl.[7] .............................................. B41M 5/40
(52) U.S. Cl. ...................................... 503/200; 503/226
(58) Field of Search .................................. 503/200, 226

(56) References Cited

U.S. PATENT DOCUMENTS

| | | | |
|---|---|---|---|
| 4,837,198 A | 6/1989 | Kuriyama et al. | 503/227 |
| 4,895,829 A | 1/1990 | Hanada et al. | 503/227 |
| 4,910,087 A | 3/1990 | Torii et al. | 428/423.1 |
| 4,942,212 A | 7/1990 | Hanada et al. | 528/28 |
| 5,192,736 A | 3/1993 | Hanada et al. | 503/26 |
| 5,700,868 A | 12/1997 | Hanada | 524/590 |
| 5,908,808 A | 6/1999 | Hanada | 503/227 |

*Primary Examiner*—Bruce H. Hess
(74) *Attorney, Agent, or Firm*—Oblon, Spivak, McClelland, Maier & Neustadt, P.C.

(57) ABSTRACT

A thermal recording media has a base sheet, a thermal recording layer arranged on one side of the base sheet, and a back layer arranged on an opposite side of the base sheet. The back layer comprises a polyurethane having side chains derived from a fluorine-containing diol represented by the following formula (I):

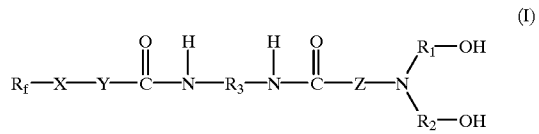

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by $-CH=CH-(CH_2)_n-$ in which n stands for an integer of from 1 to 10, or

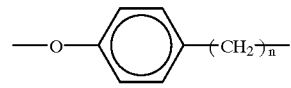

in which n stands for an integer of from 0 to 6; Y represents a direct bond, $-O-$, $-NH-$, or $-R_0-NH-$ in which $R_0$ is an alkylene group having 1 to 6 carbon atoms; Z represents a direct bond or $-N(R')R-$ in which R is an alkylene group having 1 to 20 carbon atoms and R' is a hydrogen atom or an alkyl group having 1 to 6 carbon atoms; $R_1$ and $R_2$ each independently represent a divalent organic group; and $R_3$ represents a residual group of an aliphatic, alicyclic or aromatic diisocyanate.

15 Claims, No Drawings

THERMAL RECORDING MEDIA

BACKGROUND OF THE INVENTION a) Field of the Invention

This invention relates to thermal recording media, and more specifically to thermal recording media, each of which has a back layer comprising a polyurethane with fluorine-atom-containing side chains and is useful in heat-melting-type thermal transfer recording and sublimation-type thermal transfer recording.

b) Description of the Related Art

Conventionally-known thermal recording media include heat-melting-type thermal recording media and sublimation-type thermal recording media. A heat-melting-type thermal recording medium is provided with a thermal recording layer (ink layer) formed on one side of a base sheet such as a polyester film by having a dye or pigment carried thereon with a binder resin, and the medium is heated patternwise from the back side thereof such that the ink layer is transferred onto a desired material. On the other hand, a sublimation-type thermal recording medium makes use of a heat-sublimable dye as a dye, and the dye alone is caused to sublimate such that it is transferred likewise onto a desired material.

As these recording methods are each of the type that thermal energy is applied by a thermal head from the side of the back side of a base sheet, the back side of the base sheet of each thermal recording medium for use in such a recording method is required to have sufficient slipperiness, separability, non-tackiness and the like relative to the thermal head so that the thermal head does not stick on the back side. With a view to meeting this requirement, it has been proposed, for example, to form a back layer with a silicone resin, melamine resin, phenol resin, polyimide resin, modified cellulose resin or a mixture thereof on the back side of the base sheet of a thermal recording medium (see JP S58-13359 A, for example).

To form heat-resistant back layers in the above-described thermal recording media, it has been attempted, for example, to thermally crosslink the above-described resins by using a variety of crosslinking agents or to add inorganic fillers, powders of fluorine-containing resins and/or the like to these resins. These measures can provide back layers having heat resistance, but with these resins, the slipperiness and non-tackiness relative to thermal heads are insufficient. Only silicone resin is equipped with slipperiness and non-tackiness. Silicone resin, however, develops a problem that a heating step required to fully crosslink the resin gives damage to the base sheet which is a thin film (generally, 2 to 5 μm in thickness); or a problem that, if the crosslinking is incomplete, winding of the thermal recording medium into a roll allows the unreacted low-molecular silicone to migrate from the back layer into the ink layer located in contact with the back layer, resulting in formation of obscure pictures or marks.

The present inventors conducted an investigation with a view to developing methods for overcoming these problems, and in JP S61-227087 A, JP S62-202786 A, JP H2-102096 A, etc., proposed that use of various silicone-polyurethane copolymer resins can furnish thermal recording media having excellent back layers which are endowed with heat resistance, slipperiness, non-tackiness and the like. However, keeping in step with the move toward use of hotter thermal heads and thinner base sheets associated with the move toward printing at higher speeds in recent years, still higher heat resistance, slipperiness, non-tackiness and the like are required for back layers.

To meet these requirements, there is an outstanding need for a material which makes it possible to further improve the conventional art and to form back layers with excellent properties by simpler production steps. In response to these requirements, the present inventors also proposed to use perfluoroalkyl-containing polyurethane resins for the formation of back layers (JP S62-251192 A, JP H1-11887 A, etc.). Incidentally, as a process for the preparation of a conventional one-end diol (a compound having two hydroxyl groups at only one end of its molecule) having a perfluoroalkyl group (which will hereinafter be abbreviated as "$R_f$ group"), a process which proceeds following such a reaction scheme as will be described next is known.

1)

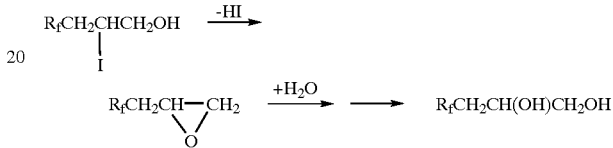

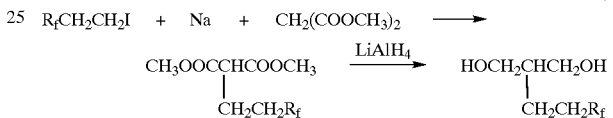

As is appreciated from the foregoing, the conventional processes for the preparation of one-end diols having the Rf group all require many steps. High-purity products of these one-end diols, each of which has the $R_f$ group, are costly so that these conventional processes have a problem in their practical use on an industrial scale. Further, there is a need to make the content of $R_f$ groups higher in a field where high performance is required as described above. The back-layer-forming resin, therefore, is so costly that it is not suited for practical use.

SUMMARY OF THE INVENTION

An object of the present invention is, therefore, to solve the above-described problems of the conventional art and hence, provide a thermal recording medium having a back layer which is formed of an economical material and is excellent in slipperiness, non-tackiness, heat resistance and the like.

The present inventors have proceeded with an extensive investigation to develop an economical process for the preparation of a one-end diol having an group, resulting in development of a novel preparation process. Further, the present inventors have also found that use of a fluorine-containing polyurethane, which employs the $R_f$-containing one-end diol available from the process, makes it possible to achieve the above-described object, leading to completion of the present invention.

The above-described object can be achieved by the present invention as will be described hereinafter.

In one aspect of the present invention, there is thus provided a thermal recording medium having a base sheet, a thermal recording layer arranged on one side of the base sheet, and a back layer arranged on an opposite side of the base sheet, wherein the back layer comprises a polyurethane having side chains derived from a fluorine-containing diol represented by the following formula (I):

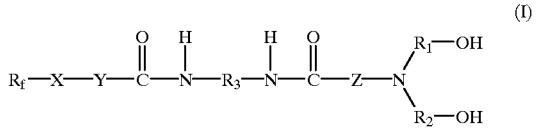

(I)

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by —CH=CH—(CH$_2$)$_n$— in which n stands for an integer of from 1 to 10, or

in which n stands for an integer of from 0 to 6; Y represents a direct bond, —O—, —NH—, or —R$_0$—NH— in which R$_0$ is an alkylene group having 1 to 6 carbon atoms; Z represents a direct bond or —N(R')R— in which R is an alkylene group having 1 to 20 carbon atoms and R' is a hydrogen atom or an alkyl group having 1 to 6 carbon atoms; R$_1$ and R$_2$ each independently represent a divalent organic group; and R$_3$ represents a residual group of an aliphatic, alicyclic or aromatic diisocyanate.

Owing to the use of the polyurethane having the side chains, each of which contains the R$_f$ group represented by the formula (I), for the formation of the back layer, the back layer is excellent in heat resistance, flexibility, the adhesion to the base sheet and also superb in the slipperiness relative to a thermal head. The thermal head, therefore, does not stick the thermal recording medium.

DETAILED DESCRIPTION OF THE INVENTION AND PREFERRED EMBODIMENTS

The present invention will next be described in further detail based on certain preferred embodiments.

The thermal recording medium according to the present invention has the thermal recording layer formed on one side of the base sheet and the back layer formed on the other side of the base sheet, and is characterized in that the polymer, which makes up the back layer, comprises the polyurethane having side chains derived from the fluorine-containing diol represented by the formula (I), that is, the R$_f$-containing one-end diol. It is to be noted that the term "polyurethane" as used herein collectively means polyurethane, polyurea and polyurethane-polyurea. Such a polyurethane can be obtained by a conventional process for the production of polyurethanes, namely, by reacting the R$_f$-containing one-end diol, an active-hydrogen-containing compound and a diisocyanate, optionally in the presence of a chain extender.

The R$_f$-containing one-end diol, which is employed for the production of the polyurethane for use in the present invention, can be prepared by the following steps:

a) Firstly, a fluorine-containing diol (1) having an active-hydrogen-containing group (for example, a hydroxyl group) and a diisocyanate (2) are reacted at an NCO/OH ratio of approximately 2 to obtain a fluorine-containing compound (3) having one free isocyanate group in its molecule.

b) Using a difference in the reactivity to an isocyanate group between an amino group and a hydroxyl group, the fluorine-containing compound (3) and a dialkanolamine (4) are then reacted at a temperature not higher than 50° C. such that the isocyanate group and the amino group are selectively reacted to obtain an R$_f$-containing one-end diol represented by the following formula (A).

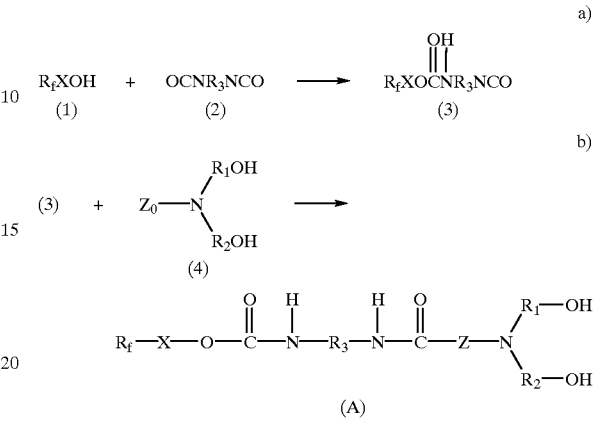

(A)

wherein $R_f$, $R_1$ to $R_3$, X and Z have the same meanings as defined above, and $Z_0$ represents H or an alkylamino group having 1 to 20 carbon atoms and a single primary or secondary amino group at an end thereof.

Examples of fluorine-containing compounds usable in the present invention can include the following compounds:

(1) Alcohol type

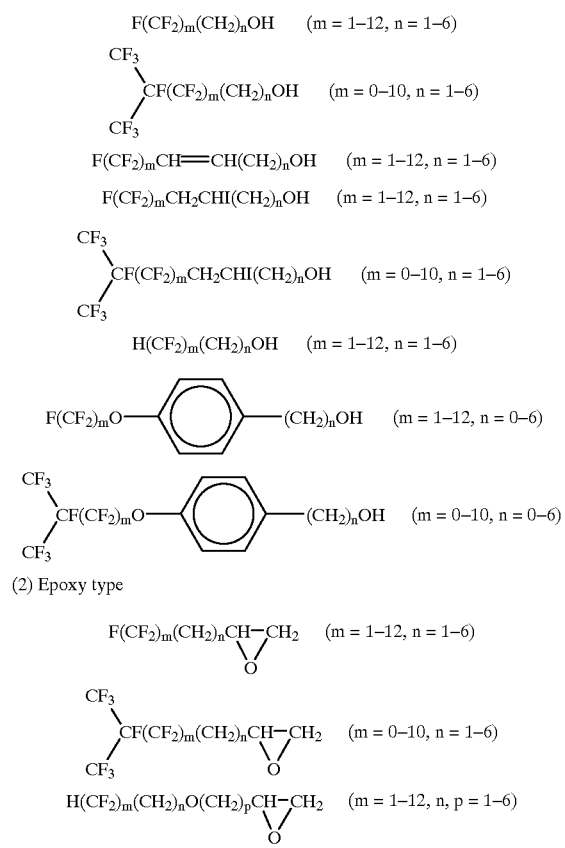

The above-described epoxy compounds are each used after introducing a terminal hydroxyl group therein by a reaction with an active-hydrogen-containing compound such as a polyol, a polyamide or a polycarboxylic acid.

(3) Amine type

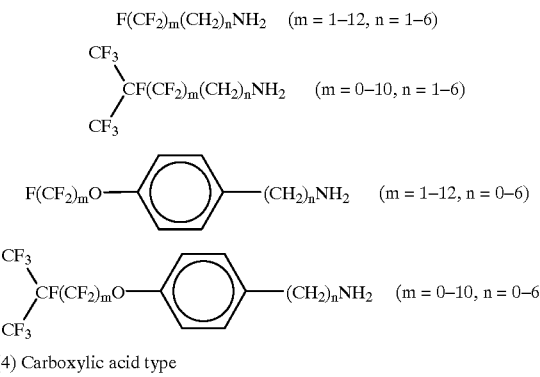

$F(CF_2)_m(CH_2)_nNH_2$ (m = 1–12, n = 1–6)

$CF_3$\\CF$(CF_2)_m(CH_2)_nNH_2$ (m = 0–10, n = 1–6) /$CF_3$ $F(CF_2)_mO$—⬡—$(CH_2)_nNH_2$ (m = 1–12, n = 0–6)

$CF_3$\\CF$(CF_2)_mO$—⬡—$(CH_2)_nNH_2$ (m = 0–10, n = 0–6) /$CF_3$ (4) Carboxylic acid type

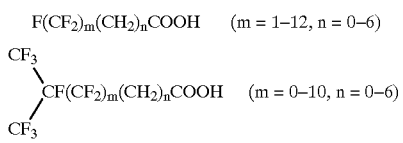

$F(CF_2)_m(CH_2)_nCOOH$ (m = 1–12, n = 0–6)

$CF_3$\\CF$(CF_2)_m(CH_2)_nCOOH$ (m = 0–10, n = 0–6) /$CF_3$

The above-listed fluorine-containing compounds, each of which has an active-hydrogen-containing group, are examples of compounds preferred for use in the present invention, and in the present invention, the fluorine-containing compound shall not be limited to these exemplified ones. In the present invention, it is therefore possible to use not only the above-exemplified fluorine-containing compounds but also known fluorine-containing compounds presently sold on the market and available from the market. Fluorine-containing compounds particularly preferred in the present invention are the above-exemplified fluorine-containing compounds of the alcohol type.

As the diisocyanate for use in the present invention, any diisocyanate known to date is usable, and no particular limitation is imposed thereon. Preferred usable examples can include aromatic diisocyanates such as toluene-2,4-diisocyanate, 4-methoxy-1,3-phenylene diisocyanate, 4-isopropyl-1,3-phenylene diisocyanate, 4-chloro-1,3-phenylene diisocyanate, 4-butoxy-1,3-phenylene diisocyanate, 2,4-diisocyanatodiphenyl ether, 4,4'-methylenebis(phenyl-isocyanate) (MDI), durylene diisocyanate, tolidine diisocyanate, xylylene diisocyanate (XDI), 1,5-naphthalene diisocyanate, benzidine diisocyanate, o-nitrobenzidine diisocyanate, and 4,4-diisocyanatodibenzyl; aliphatic diisocyanates such as methylene diisocyanate, 1,4-tetramethylene diisocyanate, 1,6-hexamethylene diisocyanate, and 1,10-decamethylene diisocyanate; alicyclic diisocyanates such as 1,4-cyclohexylene diisocyanate, 4,4-methylene-bis(cyclohexylisocyanate), 1,5-tetrahydronaphthalene diisocyanate, isophorone diisocyanate, hydrogenated MDI, and hydrogenated XDI; and obviously, polyurethane prepolymers obtained by reacting these diisocyanates with polyols or polyamines of low molecular weights such that the resulting prepolymers have isocyanate groups at ends thereof.

Examples of dialkanolamines usable in the present invention can include compounds represented by the following formula:

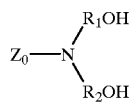

wherein $R_1$, $R_2$ and $Z_0$ have the same meanings as defined above, and preferably, $R_1$ and $R_2$ may each independently represent a divalent group having 2 to 12 carbon atoms and containing an aliphatic, alicyclic or aromatic ring, and the divalent group may contain one or more O, N and/or S atoms therein.

Preferred examples can include diethanolamine, dipropanolamine, dihexanolamine, 1-aminopropane glycol, diethanolaminomethylamine, diethanolaminoethylamine, and diethanolaminopropylamine.

A more specific description will now be made about the preparation process of the $R_f$-containing diol represented by the formula (I).

Firstly, the fluorine-containing compound, which has the active-hydrogen-containing group, and the diisocyanate are reacted at an equivalent ratio such that the reaction product contains one free isocyanate group in a molecule (NCO/OH≈2), in a solventless manner or in an organic solvent, in the presence or absence of a conventional polymerization catalyst for polyurethanes (for example, an organometal compound, a tertiary amine or the like), and at 0 to 150° C., preferably 20 to 90° C.

At a temperature of 50° C. or lower, preferably 40° C. or lower, more preferably 30° C. or lower, the above-described fluorine-containing compound having one free isocyanate group is then added dropwise into the above-described dialkanolamine.

Under these conditions, an isocyanate group selectively reacts with an amino group before a hydroxyl group [Ann. Chem., 562, 205 (1949)], whereby an $R_f$-containing one-end diol represented by the formula (I) according to the present invention is obtained and at low temperatures, a portion of the reaction product progressively precipitates as crystals in an organic solvent as the reaction proceeds. After completion of the reaction, the reaction mixture is poured into a poor solvent such as water, toluene, xylene or n-hexane to cause precipitation of the reaction product as crystals.

Unreacted diisocyanate and dialkanolamine can be eliminated by washing the precipitated crystals with a poor solvent (an aromatic or aliphatic hydrocarbon) at room temperature. The $R_f$-containing one-end diol represented by the formula (I) can, therefore, be obtained with high purity.

The fluorine-containing polyurethane for use in the present invention can be obtained by reacting the $R_f$-containing diol, which is represented by the formula (I) and has been obtained by the above-described reaction, with the above-described diisocyanate and also with the diol and/or diamine.

As the diol, diols which have been used to date for the production of polyurethane are all usable, and no limitation is imposed thereon. Illustrative are glycols of low molecular weight such as ethylene glycol, 1,2-propylene glycol, 1,3-propylene glycol, 1,4-butylene glycol, and 1,6-hexamethylene glycol; polyester diols obtained from dibasic acids, such as adipic acid, maleic acid and terephthalic acid, and glycols; polyester diols such as polylactones obtained by subjecting lactones to ring-opening polymerization with glycols; polycarbonate diols; and polyether diols such as polytetramethylene glycol, polyethylene glycol, and polypropylene glycol.

As the diamine, diamines which have been used to date for the production of polyurethane are all usable, and no particular limitation is imposed thereon. Illustrative are aliphatic diamines such as methylenediamine, ethylenediamine, trimethylenediamine, hexamethylenediamine, and octamethylenediamine; aromatic diamines such as phenylenediamine, 3,3'-dichloro-4,4'-diaminodiphenyl ether, 4,4'-methylenebis(phenyl)amine, 4,4'-diaminodiphenyl ether, and 4,4'-diaminodiphenylsulfone; and alicyclic diamines such as cyclopentadiamine and cyclohexyldiamine. Examples of the chain extender can include the above-described diols and diamines of low molecular weight. Chain extenders which have been used to date for the production of polyurethane are all usable, and no particular limitation is imposed thereon.

Using these components and a conventional process known for the production of polyurethane, the fluorine-containing polyurethane according to the present invention can be obtained. The process according to the present invention for the production of polyurethane comprises reacting the $R_f$-containing diol represented by the formula (I), the diisocyanate, the diol and/or diamine, and optionally, the chain extender. No particular limitation is imposed on the reaction conditions. Further, no particular limitation is imposed either on the reaction method, and the reaction can be performed by any method such as bulk polymerization, solution polymerization or dispersion polymerization. Moreover, a suitable combination of a diol, a diamine and a diisocyanate can be chosen depending on the application purpose and performance requirements of a target fluorine-containing polyurethane, and no particular limitation is imposed on them.

In the fluorine-containing polyurethane obtained by using the $R_f$-containing diol, the fluorine-containing side chains are bonded via $R_1$ and $R_2$ thereof to the backbone of the fluorine-containing polyurethane by means of urethane bonds (—NH—CO—O—) and/or urea bonds (NH—CO—NH—). Use of a diol provides a polyurethane, use of a diamine provides a polyurea, and combined use of a diol and an amine provides a polyurethane-polyurea.

The content of the fluorine-containing side chains in the polyurethane molecule may preferably range from 3 to 80 wt. % in terms of a fluorine content based on $R_f$ groups in the polyurethane molecule. A content lower than 3 wt. % leads to insufficient development of a function associated with surface energy based on the $R_f$ groups, while a content higher than 80 wt. % results in reductions in good properties inherent to polyurethane such as abrasion resistance and mechanical strength. Their contents outside the above-described range are, therefore, not preferred. Their content may preferably range from 5 to 50 wt. %, with a range of from 5 to 25 wt. % being more preferred.

As another embodiment of the present invention, the back layer is formed by using a fluorine-containing polyurethane which further contains polysiloxane segments, which have been derived from a polysiloxane having at least one active-hydrogen-containing group, in an amount such that the content of polysiloxane segments in the polyurethane molecule falls within a range of from 1 to 75 wt. %.

The polysiloxane for use in the present invention has at least one active-hydrogen-containing group, for example, at least one amino group, epoxy group, hydroxyl group, mercapto group, carboxyl group or like group. Preferred examples of such a polysiloxane can include the following compounds.

(1) Amino-modified polysiloxanes

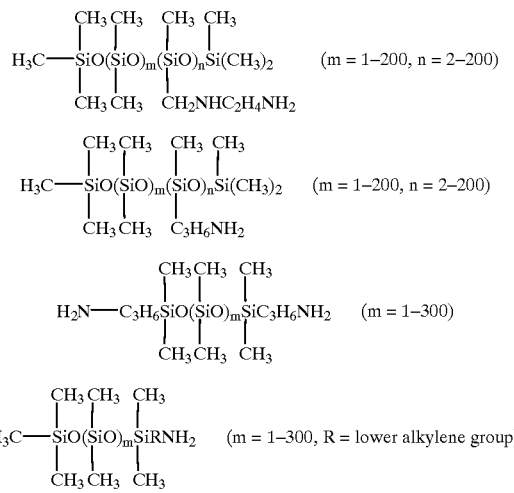

(2) Epoxy-modified polysiloxanes

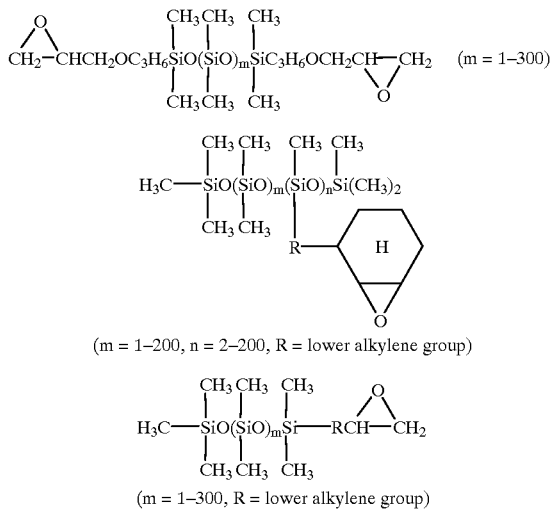

(3) Alcohol-modified polysiloxanes

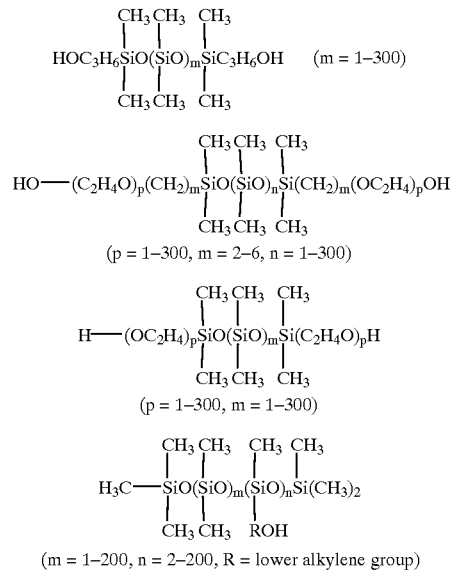

-continued $$\underset{\underset{CH_3}{|}\underset{CH_3}{|}\underset{CH_3}{|}}{\overset{\overset{CH_3}{|}\overset{CH_3}{|}\overset{CH_3}{|}}{H_3C—SiO(SiO)_m SiROH}}$$

(m = 1–300, R = lower alkylene group)

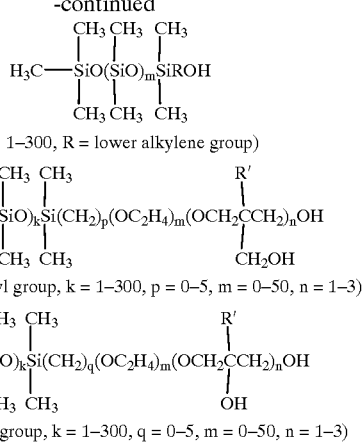

(R' = H or alkyl group, k = 1–300, p = 0–5, m = 0–50, n = 1–3)

(R' = H or alkyl group, k = 1–300, q = 0–5, m = 0–50, n = 1–3)

(4) Mercapto-modified polysiloxanes

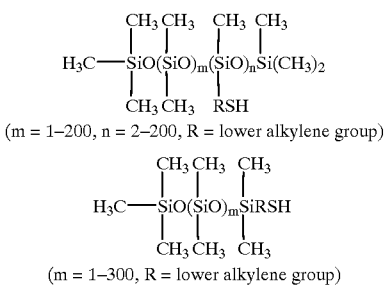

(m = 1–200, n = 2–200, R = lower alkylene group)

$$\underset{\underset{CH_3}{|}\underset{CH_3}{|}\underset{CH_3}{|}}{\overset{\overset{CH_3}{|}\overset{CH_3}{|}\overset{CH_3}{|}}{H_3C—SiO(SiO)_m SiRSH}}$$

(m = 1–300, R = lower alkylene group)

(5) Carboxyl-modified siloxanes

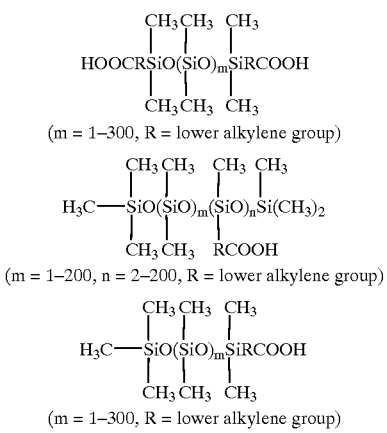

(m = 1–300, R = lower alkylene group)

(m = 1–200, n = 2–200, R = lower alkylene group)

(m = 1–300, R = lower alkylene group)

The above-listed polysiloxane, each of which has an active-hydrogen-containing group, are examples of compounds preferred for use in the present invention, and in the present invention, the siloxane shall not be limited to these exemplified compounds. Not only the above-exemplified polysiloxanes but also polysiloxanes presently sold on the market and readily available from the market are, therefore, all usable in the present invention. Polysiloxanes particularly preferred in the present invention are those containing at least one hydroxyl group or amino group.

The fluorine and silicon-containing polyurethane according to the present invention, which is available from the use of an $R_f$-containing one-end diol, a polysiloxane having at least one active-hydrogen-containing group in a molecule and the above-described another polyurethane component, is a polyurethane in which segments formed from a diisocyanate and segments formed from a diisocyanate are contained in the polyurethane backbone as in conventional polyurethanes, fluorine-containing side chains formed from a fluorine-containing diol presented by the formula (I) are bonded via $R_1$ and $R_2$ thereof to the backbone by means of urethane bonds and/or urea bonds, and polysiloxane segments formed from the polysiloxane are bonded to the backbone by means of urethane bonds and/or urea bonds.

The content of the polysiloxane segments in the polyurethane molecule may preferably be in such an amount that the siloxane content in the molecule ranges from 1 to 75 wt. %. A content lower than 1 wt. % leads to insufficient development of a function associated with surface energy based on the polysiloxane segments, while a content higher than 75 wt. % results in reductions in good properties inherent to polyurethane such as abrasion resistance and mechanical strength. Their contents outside the above-described range are, therefore, not preferred. Their content may preferably range from 3 to 50 wt. %, with a range of from 5 to 20 wt. % being more preferred.

For the production of such a fluorine-containing polyurethane of present invention as described above (the term "fluorine-containing polyurethane" as used herein will hereinafter mean to also embrace such compounds as containing polysiloxane segment(s)), the above-described polysiloxane can be used in the form of a solution in an organic solvent, a suspension in water, or pellets of 100 wt. % solid content.

The preferable fluorine content and polysiloxane segment content in the fluorine-containing polyurethane according to the present invention vary depending upon its application purpose, so that it is desired to obtain each fluorine-containing polyurethane with fluorine and polysiloxane segment contents suited for its application purpose.

The weight average molecular weight of the fluorine-containing polyurethane according to the present invention (as measured by GPC and calibrated against standard polystyrene) may range preferably from 5,000 to 500,000, more preferably from 30,000 to 150,000.

The thermal recording medium according to the present invention can be produced in a manner known to date except for the use of the above-described fluorine-containing polyurethane, and no particular limitation is imposed on the production process itself. Further, no particular limitation is imposed either on materials other than the material for forming the back layer, such as materials for forming the thermal recording layer. The back layer in the present invention is formed by coating a solution of the above-described fluorine-containing polyurethane onto the base sheet by a conventionally-known coating means to give a dry coat thickness of about 0.01 to 1 μm and then, drying it into a coating. In the present invention, the coating of the fluorine-containing polyurethane may be used after converting it into a crosslinked coating with a crosslinking agent although it can be used as is.

As the crosslinking agent, conventionally-known crosslinking agents which are used for crosslinking polyurethanes are all usable, and no particular limitation is imposed thereon. Examples can include addition products of polyisocyanates of the following structural formulas with other compounds:

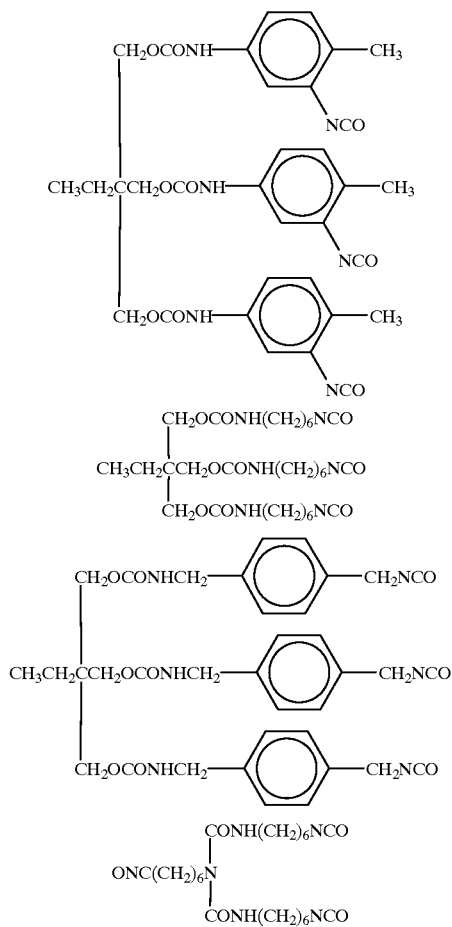

Upon formation of the back layer, one or more of conventionally-known various binder resins can be additionally used in combination to improve the coatability to the base sheet, the film-forming property and the like. Such binder resins may preferably be those capable of chemically reacting with crosslinking agents such as the above-described polyisocyanate addition products, although those having no such reactivity can still be used in the present invention.

As these binder resins, binder resins which have conventionally been used for the formation of such back layers can be used, and no particular limitation is imposed thereon. Usable examples can include acrylic resins, polyurethane resins, polyester resins, polybutadiene resins, silicone resins, melamine resins, phenol resins, polyvinyl chloride resins, cellulose resins, epoxy resins, polyvinyl butyral resins, alkyd resins, modified cellulose resins, fluorine-containing resins, and polyamide resins. Also usable are resins obtained by modifying the various resins with silicones or fluorine. When one or more of these binder resins are used in combination, they can be used in a total amount of from 5 to 90 wt. % on the basis of the fluorine-containing polyurethane.

As fluorine atoms (and siloxane segments) are oriented toward the surface of the back layer in the thermal recording medium according to the present invention, the surface is imparted with heat resistance, slipperiness, and non-tackiness to thermal heads, which the fluorine atoms (and siloxane segments) have. Moreover, polyurethane backbones strongly interact with the base sheet at the interface between the back layer and the base sheet, so that the back layer is imparted with excellent adhesion to the base sheet and also with flexibility. The thermal recording medium furnished by the present invention is, therefore, endowed with excellent properties.

The present invention will hereinafter be described more specifically based on Referential Examples, Polymerization Examples, Examples and Comparative Examples. It should, however, be borne in mind that the present invention is not limited to or by these Examples. In the following Examples, all designations of "part" or "parts" and "%" are on weight basis unless otherwise specifically indicated.

REFERENTIAL EXAMPLE 1

[Synthesis of fluorine-containing diol (I-A)]

In a reaction vessel equipped with a stirrer, a thermometer, a nitrogen gas inlet tube and a reflux condenser and purged with nitrogen gas, toluene-2,4-diisocyanate (17.4 parts) was dissolved in ethyl acetate (50 parts). The resultant solution was heated to 60° C., at which under thorough stirring, powdery 2-(perfluorooctyl)ethanol (46.4 parts) was gradually added. After completion of the addition, the isophorone diisocyanate and 2-(perfluoro-octyl)ethanol were reacted at 80° C. for 3 hours, whereby a perfluoroalkyl-containing one-end isocyanate (A) was formed.

Diethanolamine (10.5 parts) was next mixed in ethyl acetate (10 parts) at temperatures not higher than 10° C. under stirring, and into the resulting solution, the reaction mixture with the compound (A) contained therein was added dropwise. With each dropwise addition of the reaction mixture with the compound (A) contained therein, occurrence of an exothermic reaction was observed. The dropwise addition was, therefore, effected such that the internal temperature did not exceed 20° C. As the reaction proceeded, the reaction mixture changed from a non-homogeneous solution into a homogeneous solution. Subsequent to completion of the dropwise addition, the reaction was allowed to continue for 2 hours at room temperature (25° C.).

After completion of the reaction, toluene was added to the reaction mixture to have the reaction product precipitated. The precipitate was collected by filtration, washed and then dried, whereby a fluorine-containing diol represented by the below-described formula (I-A) was obtained as white powder (yield: 95%, melting point: 145° C., hydroxyl number: 148).

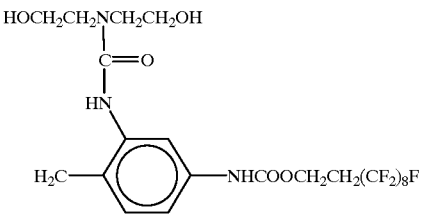

(I-A)

REFERENTIAL EXAMPLE 2

[Synthesis of fluorine-containing diol (I-B)]

A fluorine-containing diol having the below-described structural formula (I-B) was obtained as white powder in a similar manner as in Referential Example 1 except that in place of toluene-2,4-diisocyanate and 2-(perfluorooctyl) ethanol, isophorone diisocyanate and 2-(perfluoro-7-methyloctyl)-ethanol were used in the same equivalent amounts, respectively (yield: 95%, melting point: 132° C., hydroxyl number: 138).

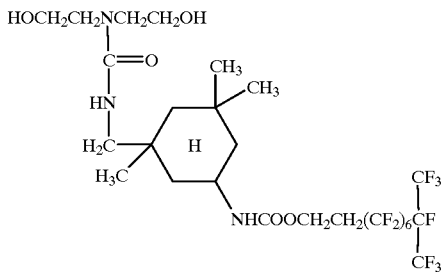

(I-B)

REFERENTIAL EXAMPLE 3

[Synthesis of fluorine-containing diol (I-C)]

A fluorine-containing diol having the below-described structural formula (I-C) was obtained as white powder in a similar manner as in Referential Example 2 except that in place of diethanolamine and 2-(perfluoro-7-methyloctyl)ethanol, diethanolaminopropylamine and 2-(perfluorodecyl) ethanol were used in the same equivalent amounts, respectively (yield: 95%, melting point: 153° C., hydroxyl number: 115).

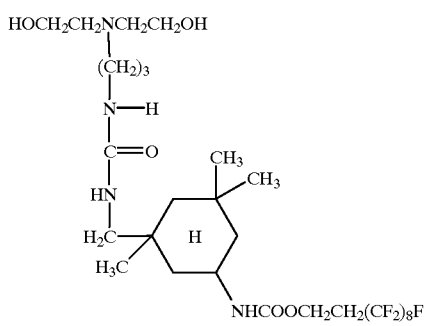

(I-C)

REFERENTIAL EXAMPLE 4

[Synthesis of fluorine-containing diol (I-D)]

A fluorine-containing diol having the below-described structural formula (I-D) was obtained as white powder in a similar manner as in Referential Example 2 except that in place of 2-(perfluoro-7-methyloctyl)ethanol, 2-(perfluorooctyl)ethanol were used in the same equivalent amount (yield: 95%, melting point: 132° C., hydroxyl number: 138).

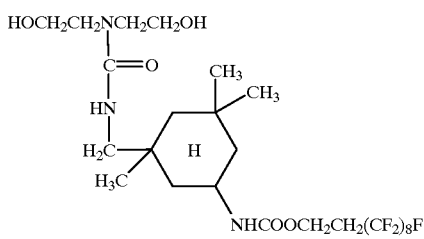

(I-D)

POLYMERIZATION EXAMPLES 1–3

(Production of polyurethanes)

In each of the Examples, a reaction vessel equipped with a stirrer, a thermometer, a nitrogen gas inlet tube and a reflux condenser was purged with nitrogen gas, and into the reaction vessel, the corresponding fluorine-containing diol, the corresponding fluorine-free polymer diol and the fluorine-free diol, all of which are shown in Table 1—1, were added. Dimethylformamide was added in an amount such that a reaction mixture to be finally obtained would have a solid content of 35%, whereby a homogeneous solution was obtained. The diisocyanate shown in Table 1—1 was then added in a predetermined amount. A reaction was conducted at 80° C. until a predetermined solution viscosity was reached. Properties of three fluorine-containing polyurethanes obtained as described above are shown below in Table 1—1.

TABLE 1-1

|  | Polymerization Example 1 | Polymerization Example 2 | Polymerization Example 3 |
|---|---|---|---|
| Composition of PU raw materials |  |  |  |
| Fluorine-containing diol (i) | I-A | I-B | I-C |
| Polymer diol (ii) | POTMG(*1) | PCDO(*2) | PCLPO(*3) |
| Diol (iii) | 1,4-BG(*4) | *4 | *4 |
| i/ii/iii (weight ratio) | 2.5/12.5/1 | 6/15/1 | 12/10/1 |
| Diisocyanate | *5 | *5 | *5 |
| NCO/OH (molar ratio) | 1.02/1.00 | 1.02/1.00 | 1.02/1.00 |
| PU properties |  |  |  |
| Solution viscosity (35% concentration, dPa.s) | 240 | 320 | 200 |
| Weight average m.w. | 67,000 | 78,000 | 56,000 |
| Fluorine content (%) | 6 | 12 | 20 |
| Physical properties of PU |  |  |  |
| 100% modulus (20° C., MPa) | 3.6 | 6.6 | 7.1 |
| Breaking strength (20° C., MPa) | 52 | 56 | 49 |
| Breaking extension (20° C., %) | 560 | 545 | 480 |

(Note) (common to Table 1-1 to Table 2-2)
*1 polyoxytetramethylene glycol, m.w.: 2000
*2 polycarbonatediol, m.w.: 2000
*3 polycaprolactonepolyol, m.w.: 2000
*4 1,4-butylene glycol
*5 4,4'-methylenebis (phenyl isocyanate)
PU: polyurethane

EXAMPLES 4–6

(Production of polyurethanes)

In each of the Examples, a reaction vessel equipped with a stirrer, a thermometer, a nitrogen gas inlet tube and a reflux condenser was purged with nitrogen gas, and into the reaction vessel, the corresponding one of the above-described fluorine-containing diols (I-A, I-C, I-D), the corresponding one of the below-described polysiloxanes (II-A, II-B, II-C), the corresponding fluorine and polysiloxane-free polymer diol shown in Table 1–2 and the fluorine and polysiloxane-free diol of low molecular weight shown in Table 1–2 were added in the proportions shown in Table 1–2, respectively. Dimethyl-formamide was added in an amount such that a reaction mixture to be finally obtained would have a solid content of 35%, whereby a homogeneous solution was obtained. The diisocyanate shown in Table 1–2 was then added in a predetermined equivalent amount. A reaction was conducted at 80° C. until a predetermined solution viscosity was reached. Properties of three fluorine and silicon-containing polyurethanes obtained as described above are shown below in Table 1–2.

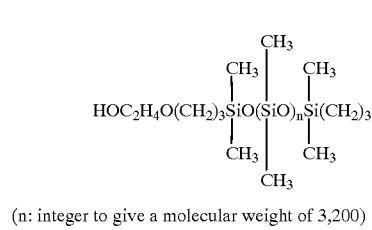
(II-A)

(n: integer to give a molecular weight of 3,200)

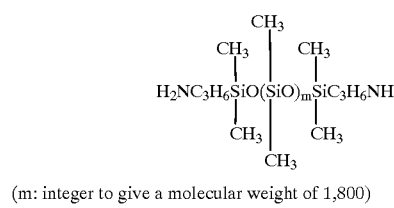
(II-B)

(m: integer to give a molecular weight of 1,800)

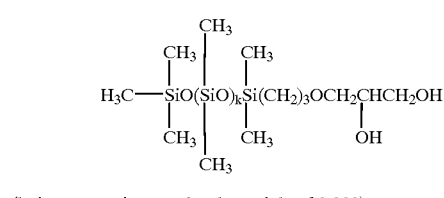
(II-C)

(k: integer to give a molecular weight of 2,000)

TABLE 1-2

|  | Polymerization Example 4 | Polymerization Example 5 | Polymerization Example 6 |
|---|---|---|---|
| Composition of PU raw materials | | | |
| Fluorine-containing diol (i) | I-D | I-A | I-C |
| Polysiloxane (ii) | II-A | II-B | II-C |
| Polymer diol (iii) | *1 | *2 | *3 |
| Diol (iv) | *4 | *4 | *4 |
| i/ii/iii/iv (wt. ratio) | 7/3/20/1 | 12/8/10/1 | 30/10/10/1 |
| Diisocyanate | *5 | *5 | *5 |
| NCO/OH (molar ratio) | 1.02/1.00 | 1.02/1.00 | 1.02/1.00 |
| PU properties | | | |
| Solid content (%) | 35 | 35 | 35 |
| Solution viscosity (25° C., dPa.s) | 250 | 310 | 210 |
| Weight average m.w. | 68,000 | 72,000 | 57,000 |
| Fluorine content (%) | 7 | 13 | 19 |
| Siloxane content (%) | 8 | 18 | 14 |
| Pysical properties of PU | | | |
| 100% modulus (MPa) 20° C. | 4.2 | 5.9 | 7.2 |
| Breaking strength (MPa) 20° C. | 48 | 52 | 50 |
| Breaking extension (%) 20° C. | 510 | 500 | 520 |

COMPARATIVE POLYMERIZATION EXAMPLES 1–3

(Production of polyurethanes)

Two fluorine-containing polyurethanes were produced in a similar manner as in Polymerization Examples 1–3 except that the below-described fluorine-containing compounds (I-A', I-B') were used, respectively (Comparative Polymerization Examples 1 and 2). In addition, a further polyurethane was produced without using any fluorine-containing diol (Comparative Polymerization Example 3). Properties of these polyurethanes are shown below in Table 2-1.

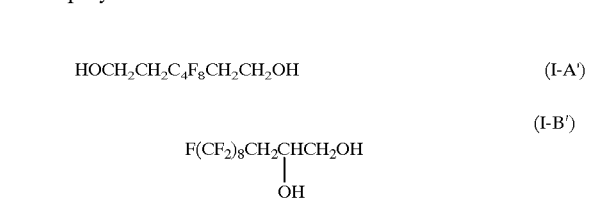

(I-A')

(I-B')

TABLE 2-1

|  | Comparative Polymerization Example 1 | Comparative Polymerization Example 2 | Comparative Polymerization Example 3 |
|---|---|---|---|
| Composition of PU raw materials | | | |
| Fluorine-containing diol (i) | I-A' | I-B' | — |
| Polymer diol (ii) | *1 | *2 | *3 |
| Diol (iii) | *4 | *4 | *4 |
| i/ii/iii (weight ratio) | 3.3/6.7/1 | 3/7/1 | 0/15/1 |
| Diisocyanate | *5 | *5 | *5 |
| NCO/OH (molar ratio) | 1.02/1.00 | 1.02/1.00 | 1.02/1.00 |
| PU properties | | | |
| Solution viscosity (35% concentration, dPa.s) | 300 | 280 | 350 |
| Weight average m.w. | 69,000 | 70,000 | 82,000 |
| Fluorine content (%) | 12 | 15 | 0 |
| Physical properties of PU | | | |
| 100% modulus (20° C., MPa) | 19.4 | 18.1 | 5.6 |
| Breaking strength (20° C., MPa) | 76 | 56 | 57 |
| Breaking extension (20° C., %) | 360 | 285 | 400 |

COMPARATIVE POLYMERIZATION EXAMPLES 4–6

(Production of polyurethanes)

Two fluorine-containing polyurethanes were produced in a similar manner as in Polymerization Examples 4–6 except that the above-described fluorine-containing compounds (I-A', I-B') were used, respectively (Comparative Polymerization Examples 4 and 5). In addition, a further polyurethane was produced without using any fluorine-containing diol (Comparative Polymerization Example 6) Properties of these polyurethanes are shown below in Table 2—2.

TABLE 2-2

|  | Comparative Polymerization Example 4 | Comparative Polymerization Example 5 | Comparative Polymerization Example 6 |
|---|---|---|---|
| Composition of PU raw materials | | | |
| Fluorine-containing diol (i) | I-A' | I-B' | — |

TABLE 2-2-continued

|  | Comparative Polymerization Example 4 | Comparative Polymerization Example 5 | Comparative Polymerization Example 6 |
|---|---|---|---|
| Polysiloxane (ii) | — | II-A | — |
| Polymer diol (iii) | *1 | *2 | *3 |
| Diol (iv) | *4 | *4 | *4 |
| i/ii/iii/iv (wt. ratio) | 3.3/0/6.7/1 | 7/3/20/1 | 0/0/15/1 |
| Diisocyanate | *5 | *5 | *5 |
| NCO/OH (molar ratio) | 1.02/1.00 | 1.02/1.00 | 1.02/1.00 |
| PU properties |  |  |  |
| Solid content (%) | 35 | 35 | 35 |
| Solution viscosity (25° C., dPa.s) | 300 | 290 | 350 |
| Weight average m.w. | 71,000 | 68,000 | 82,000 |
| Fluorine content (%) | 10 | 15 | 0 |
| Siloxane content (%) | 0 | 9 | 0 |
| Physical properties of PU |  |  |  |
| 100% modulus (MPa) 20° C. | 19.4 | 17.5 | 5.6 |
| Breaking strength (MPa) 20° C. | 76 | 51 | 57 |
| Breaking extension (%) 20° C. | 360 | 450 | 400 |

In the Polymerization Examples described above, the fluorine content in each polyurethane was measured using an ion-exchange chromatographic analyzer (manufactured by Yokogawa Hokushin Denki K.K.), while its polysiloxane segment content was measured in terms of siloxane content in accordance with the infrared spectrophotometric analysis method set out in JIS K0117. Its solution viscosity was measured at 25° C. by using a Brookfield viscometer. By GPC, its weight average molecular weight was determined in terms of a weight average molecular weight calibrated against standard polystyrene. Further, its physical properties were measured in accordance with JIS K6301.

EXAMPLES 1–6 AND COMPARATIVE EXAMPLES 1–7

In each of Examples 1–6 and Comparative Examples 1–6, the polyurethane solution (solid content: 35%)—which had been obtained finally as the polymerization reaction mixture in the corresponding one of Polymerization Examples 1–6 and Comparative Polymerization Examples 1–6 - was coated by gravure printing onto a surface of a polyethylene terephthalate film of 3.5 µm in thickness (product of Toray Industries, Inc.) to give a dry coat thickness of 0.3 µm, and in a dryer, the thus-coated film was dried to form a heat-resistant, slippery back layer on the surface of the polyethylene terephthalate film as a base sheet.

In Comparative Example 7, a silicone resin ("KS-841", trade name; product of Shin-Etsu Chemical Co., Ltd.) (100 parts) and a catalyst ("PL-7", trade name; product of Shin-Etsu Chemical Co., Ltd.) (1 part) were dissolved in toluene (1,000 parts), whereby a coating formulation of the silicone resin was prepared. In a similar manner as described above, the coating formulation was applied onto a similar back sheet to form a back layer.

An ink composition of the below-described formula was heated to 100° C., and as a hot melt, was coated by a roll coating method onto a surface of the base film, said surface being located on a side opposite to the back layer formed as descried above in each of Examples 1–6 and Comparative Examples 1–7, to give a coat weight of 5 um, whereby a transfer ink layer was formed. In this manner, heat transfer recording media making use of the polyurethanes of Polymerization Examples 1–6 and Comparative Polymerization Examples 1–6, respectively, were obtained (Examples 1–6 and Comparative Examples 1–6), and a heat transfer recording medium making use of the silicone resin was also obtained (Comparative Example 7).

| (Ink composition) | |
|---|---|
| Paraffin wax | 10 parts |
| Carnauba wax | 10 parts |
| Polybutene (product of NIPPON MITSUBISHI OIL CORPORATION) | 1 part |
| Carbon black | 2 parts |

Using each sample thermal recording medium obtained as described above, printing was performed by a thin-layer thermal head under conditions of 1 mJ/dod ($4 \times 10^{-4}/cm^2$) printing energy. In the course of the printing, the sticking tendency, head smearing tendency, adhesion and coefficient of static friction of the sample thermal recording medium were observed or measured for their ranking. As the sticking tendency, the separability of the thermal head from the thermal recording medium upon pressing the thermal head against the thermal recording medium when the thermal recording medium was subjected to an on-machine test was visually determined, and was ranked in accordance with a 5-stage ranking system, the best separability medium receiving a "5" and the worst separability medium receiving a "1".

As the head smearing tendency, on the other hand, the extent of smearing of the thermal head was observed when the thermal recording medium was subjected to the one-machine test, and was ranked in accordance with a 5-stage ranking system, the least smearing medium receiving a "5" and the most severely smearing medium receiving a "1".

The adhesion was ranked by subjecting the back layer of the sample thermal recording medium to a crosshatching test while using a cellophane tape. Further, the coefficient of static friction was ranked by testing the heat-resistant, slippery back layer of the sample thermal recording medium on a surface property tester (manufactured by Shinto Scientific Co., Ltd.).

The results of the above ranking are presented in Table 3.

TABLE 3

|  | Sticking tendency | Head smearing tendency | Adhesion | Coefficient of static friction |
|---|---|---|---|---|
| Ex. 1 (Polymerization Ex. 1) | 5 | 5 | 100/100 | 0.21 |
| Ex. 2 (Polymerization Ex. 2) | 5 | 5 | 100/100 | 0.15 |
| Ex. 3 (Polymerization Ex. 3) | 5 | 5 | 100/100 | 0.10 |
| Ex. 4 (Polymerization Ex. 4) | 5 | 5 | 100/100 | 0.12 |

TABLE 3-continued

|  | Sticking tendency | Head smearing tendency | Adhesion | Coefficient of static friction |
|---|---|---|---|---|
| Ex. 5 (Polymerization Ex. 5) | 5 | 5 | 100/100 | 0.10 |
| Ex. 6 (Polymerization Ex. 6) | 5 | 5 | 100/100 | 0.09 |
| Comp. Ex. 1 (Comp. Polymerization Ex. 1) | 5 | 2 | 100/100 | 0.09 |
| Comp. Ex. 2 (Comp. Polymerization Ex. 2) | 2 | 2 | 50/100 | 0.28 |
| Comp. Ex. 3 (Comp. Polymerization Ex. 3) | 5 | 3 (smear built up) | 100/100 | 0.15 |
| Comp. Ex. 4 (Comp. Polymerization Ex. 4) | 5 | 2 | 100/100 | 0.09 |
| Comp. Ex. 5 (Comp. Polymerization Ex. 5) | 2 | 2 | 50/100 | 0.28 |
| Comp. Ex. 6 (Comp. Polymerization Ex. 6) | 5 | 3 (smear built up) | 100/100 | 0.10 |
| Comp. Ex. 7 | 1 (feeding prevented) | — | 0/100 | 0.62 |

(Note) Each parenthesized polymerization example or comparative polymerization example number indicates the polymerization example or comparative polymerization example in which the polyurethane was obtained.

EXAMPLES 7–14

Fluorine-containing diols were obtained in a similar manner as in Referential Example 1 except that the below-described fluorine-containing alcohols 1–8 were used, respectively, in lieu of 2-(perfluorooctyl)ethanol. Using the thus-obtained fluorine-containing diols, the corresponding fluorine-containing (polysiloxane-containing) polyurethanes were also obtained in a similar manner as in Polymerization Examples 1 and 4. Employing the resultant fluorine-containing (polysiloxane-containing) polyurethanes, thermal recording media (Examples 7–14) according to the present invention excellent in various physical properties were obtained, respectively, in a similar manner as in Examples 1 and 4.

Used fluorine-containing alcohols

1. $F(CF_2)_m(CH_2)_nOH$  (m = 6, n = 6)

2. 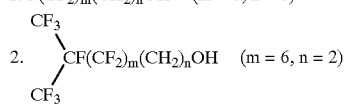  (m = 6, n = 2)

3. $F(CF_2)_mCH{=}CH(CH_2)_nOH$  (m = 8, n = 2)
4. $F(CF_2)_mCH_2CHI(CH_2)_nOH$  (m = 10, n = 2)

5. 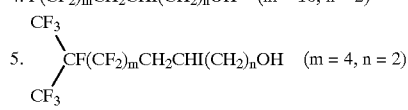  (m = 4, n = 2)

6. $H(CF_2)_m(CH_2)_nOH$  (m = 8, n = 1)

7. 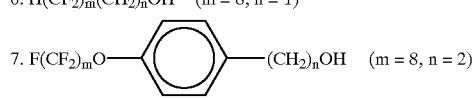  (m = 8, n = 2)

8. 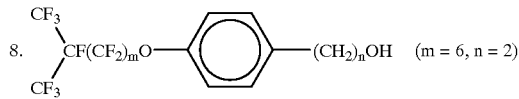  (m = 6, n = 2)

What is claimed is:

1. A thermal recording medium having a base sheet, a thermal recording layer arranged on one side of said base sheet, and a back layer arranged on an opposite side of said base sheet, wherein said back layer comprises a polyurethane having side chains derived from a fluorine-containing diol represented by the following formula (I):

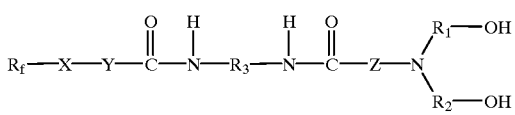

(I)

wherein $R_f$ represents a perfluoroalkyl or perfluoroalkenyl group having 1 to 20 carbon atoms; X represents a substituted or unsubstituted alkylene group having 1 to 10 carbon atoms, a substituted or unsubstituted alkenylene group represented by —CH=CH—(CH$_2$)$_n$— in which n stands for an integer of from 1 to 10, or

in which n stands for an integer of from 0 to 6; Y represents a direct bond, —O—, —NH—, or —R$_0$—NH— in which R$_0$ is an alkylene group having 1 to 6 carbon atoms; Z represents a direct bond or —N(R')R— in which R is an alkylene group having 1 to 20 carbon atoms and R' is a hydrogen atom or an alkyl group having 1 to 6 carbon atoms; R$_1$ and R$_2$ each independently represent a divalent organic group; and R$_3$ represents a residual group of an aliphatic, alicyclic or aromatic diisocyanate.

2. A thermal recording medium according to claim 1, wherein in said fluorine-containing diol represented by the formula (I), R$_1$ and R$_2$ each independently represent a methylene group having 2 to 4 carbon atoms, Y represents an oxygen atom, and each of said side chains is bonded via R$_1$ and R$_2$ thereof to a backbone of said polyurethane by means of a urethane bond.

3. A thermal recording medium according to claim 1, wherein said R$_f$—X—Y group in said formula (I) is a group derived by eliminating a hydrogen atom from a hydroxyl group of at least one of the following compounds:

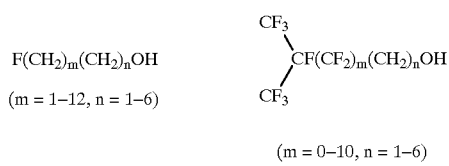

-continued

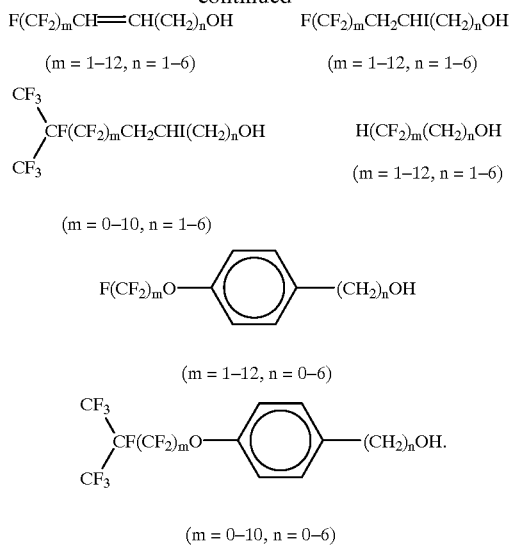

4. A thermal recording medium according to claim 1, wherein said Z—N(R$_1$OH)(R$_2$OH) group is a group derived by eliminating a hydrogen atom from an active-hydrogen-containing group bonded to Z$_0$, said active-hydrogen-containing group being represented by the following formula:

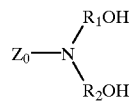

wherein R$_1$ and R$_2$ have the same meanings as defined above, and Z$_0$ represents H or an alkylamino group having 1 to 20 carbon atoms and a single primary or secondary amino group at an end thereof.

5. A thermal recording medium according to claim 1, wherein said polyurethane contains said side chains, which have been derived from said fluorine-containing diol represented by the formula (I), at a content such that said polyurethane has a fluorine content of from 3 to 80 wt. %.

6. A thermal recording medium according to claim 5, wherein said fluorine content ranges from 5 to 50 wt. %.

7. A thermal recording medium according to claim 6, wherein said fluorine content ranges from 5 to 25 wt. %.

8. A thermal recording medium according to claim 1, wherein said polyurethane further comprises 1 to 75 wt. % of polysiloxane segments derived from a polysiloxane having at least one active-hydrogen-containing group.

9. A thermal recording medium according to claim 8, wherein said active-hydrogen-containing group of said polysiloxane is a hydroxyl group or an amino group.

10. A thermal recording medium according to claim 8, wherein a content of said polysiloxane segments ranges from 3 to 50 wt. %.

11. A thermal recording medium according to claim 10, wherein said content of said polysiloxane segments ranges from 3 to 20 wt. %.

12. A thermal recording medium according to claim 1, wherein said polyurethane has a weight average molecular weight of from 50,000 to 500,000.

13. A thermal recording medium according to claim 12, wherein said weight average molecular weight ranges from 50,000 to 150,000.

14. A thermal recording medium according to claim 1, wherein said back layer further comprises an additional resin.

15. A thermal recording medium according to claim 1, wherein said back layer is a coating.

* * * * *